United States Patent
Yun

(10) Patent No.: US 11,440,383 B2
(45) Date of Patent: Sep. 13, 2022

(54) X-TYPE GUIDE BAR STRUCTURE FOR PREVENTING OPPOSITE SLIDING DOORS FROM SWAYING

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 312 days.

(21) Appl. No.: 16/901,540

(22) Filed: Jun. 15, 2020

(65) Prior Publication Data

US 2021/0178869 A1    Jun. 17, 2021

(30) Foreign Application Priority Data

Dec. 12, 2019    (KR) .................. 10-2019-0166020

(51) Int. Cl.
*B60J 5/06*    (2006.01)
*E05D 15/10*    (2006.01)
*E05D 15/30*    (2006.01)

(52) U.S. Cl.
CPC .............. *B60J 5/06* (2013.01); *E05D 15/101* (2013.01); *E05D 15/30* (2013.01); *E05D 2015/1086* (2013.01); *E05Y 2201/708* (2013.01); *E05Y 2900/531* (2013.01)

(58) Field of Classification Search
CPC ......... B60J 5/06; E05D 15/101; E05D 15/30; E05D 2015/1086; E05D 2015/1026; E05Y 2201/708; E05Y 2900/531; E05Y 2201/626; E05Y 2201/684
USPC ......................................................... 296/155
See application file for complete search history.

(56) References Cited

U.S. PATENT DOCUMENTS

2012/0031004 A1*  2/2012  Boettcher ............. E05D 15/101
                                                     49/154
2016/0356069 A1   12/2016  Choi et al.

FOREIGN PATENT DOCUMENTS

| CN | 201486331 U | * | 5/2010 | ............ E05F 15/646 |
| GB | 2462687 A | * | 2/2010 | ............ E05D 15/30 |
| KR | 101684536 B1 | | 12/2016 | |

* cited by examiner

*Primary Examiner* — Pinel E Romain
(74) *Attorney, Agent, or Firm* — Slater Matsil, LLP

(57) ABSTRACT

An X-type guide bar structure includes a lower rail mounted in a longitudinal direction at a lower side of a vehicle body, a lower slider rollably connected to the lower rail, a guide rail mounted on a door in the longitudinal direction of the vehicle body, first and second guide sliders movably connected to the guide rail, and first and second guide bars having guide paths in the longitudinal direction, wherein the first guide bar is rotatably connected to the lower slider and the second guide slider, the second guide bar is rotatably connected to the lower rail and the first guide slider, the first and second guide bars overlap in an X shape so that the guide paths face each other, and a guide pin is inserted into a central portion of the X shape.

20 Claims, 7 Drawing Sheets

X-TYPE GUIDE BAR STRUCTURE FOR PREVENTING OPPOSITE SLIDING DOORS FROM SWAYING

CROSS-REFERENCE TO RELATED APPLICATIONS

This application claims priority to Korean Patent Application No. 10-2019-0166020, filed in the Korean Intellectual Property Office on Dec. 12, 2019, which application is hereby incorporated herein by reference.

TECHNICAL FIELD

The present invention relates to a dual lower rail structure for opposite sliding doors.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle in which a sliding door is slidably supported only with center and lower rails. For example, Korean Patent No. 10-1684536 (Sliding Door System for Vehicle, corresponding to U.S. Pat. No. 9,777,811) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIGS. 1 and 2, in the sliding structure in the related art, as support points at which the sliding door is supported, two support points including a contact point A between the lower rail and a lower rail roller unit and a contact point B between the center rail and the center slider are formed in a vertical direction. However, there is a problem in that the door 1 rotates about an imaginary axis X connecting the contact points.

SUMMARY

The present invention relates to a dual lower rail structure for opposite sliding doors. Particular embodiments relate to an X-type guide bar structure for preventing opposite sliding doors from swaying, which can prevent swaying of sliding doors and stably support the sliding doors in a vehicle mounted with the sliding doors and having only center and lower rails.

Embodiments of the present invention have been made in an effort to provide a new type of structure capable of preventing swaying of a sliding door when the sliding door is opened or closed in a vehicle mounted with the sliding door and having only center and lower rails.

An exemplary embodiment of the present invention provides an X-type guide bar structure for preventing opposite sliding doors from swaying, the X-type guide bar structure including a lower rail mounted in a longitudinal direction at a lower side of a vehicle body, a lower slider rollably connected to the lower rail, a guide rail mounted on the door in the longitudinal direction of the vehicle body, first and second guide sliders movably connected to the guide rail, and first and second guide bars having guide paths in the longitudinal direction. Here, the first guide bar may be rotatably connected to the lower slider and the second guide slider, the second guide bar may be rotatably connected to the lower rail and the first guide slider, the first and second guide bars may overlap in an X shape so that the guide paths face each other, and a guide pin may be inserted into a central portion of the X shape.

According to embodiments of the present invention, since the four support points at which the door is supported are added, it is possible to prevent the door from swaying and stably support the door.

According to embodiments of the present invention, since the X shape formed by the first guide bar and the second guide bar is formed in parallel with the vehicle body, the door is prevented from swaying in the width direction of the vehicle body.

According to embodiments of the present invention, the frictional force formed between the first guide bar and the second guide bar is adjusted by the guide pin, such that the operating force of the X-type guide bar structure may be controlled.

DETAILED DESCRIPTION OF ILLUSTRATIVE EMBODIMENTS

Figure 1:
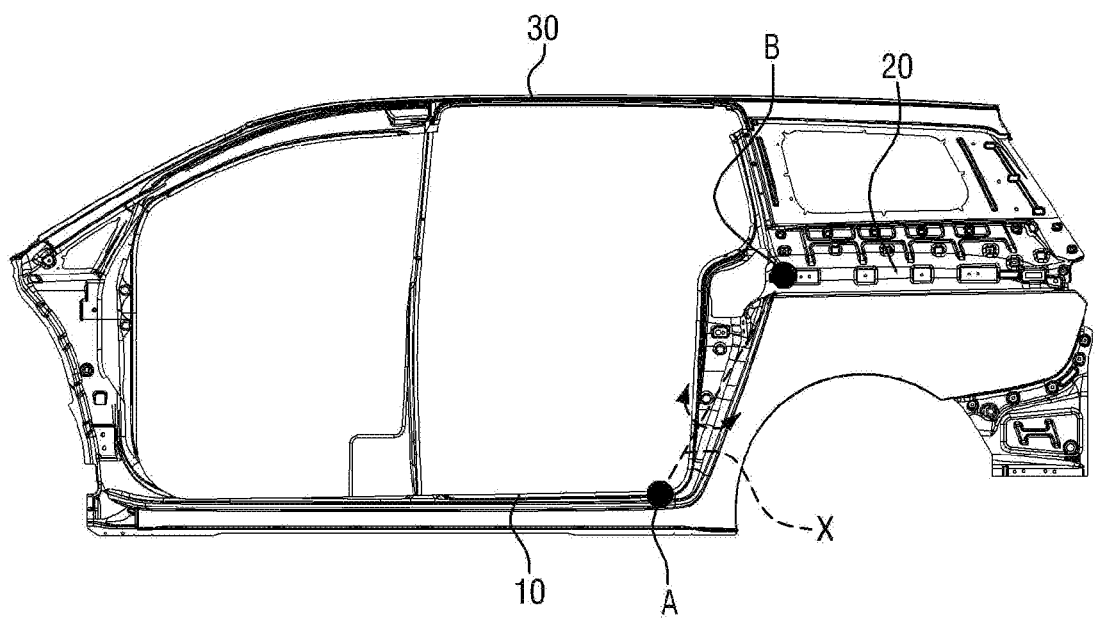
FIG. 1 is a view illustrating support points at which a sliding door for a vehicle having only center and lower rails in the related art is supported.
Figure 2:
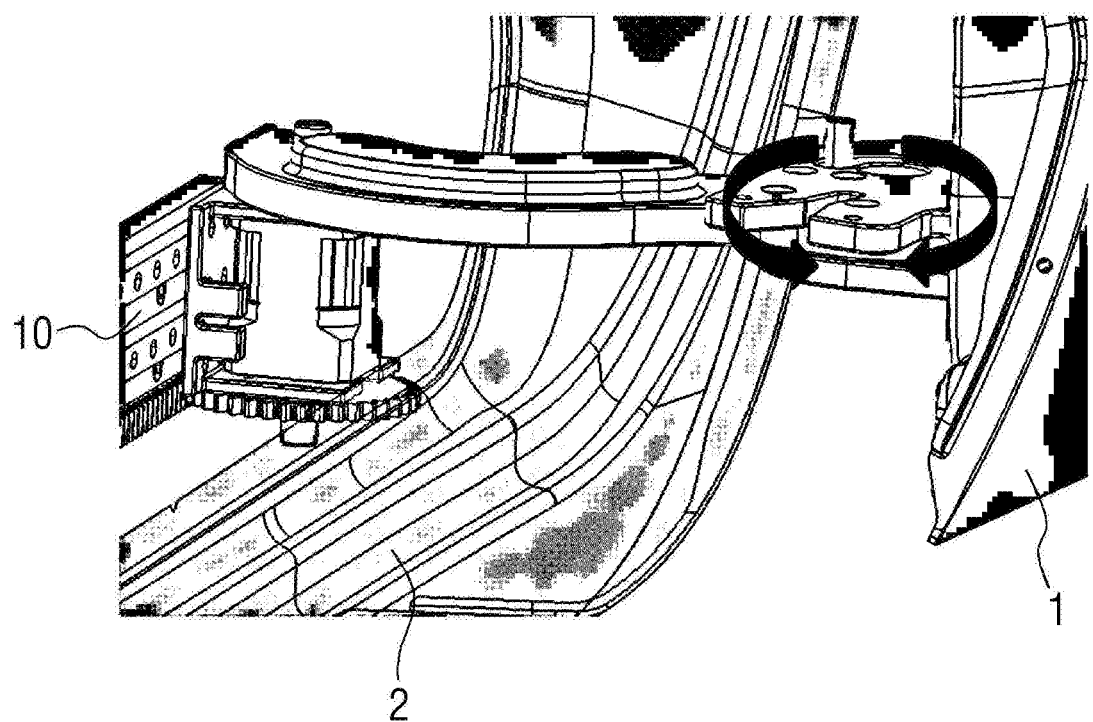
FIG. 2 is a view illustrating a state in which the sliding door illustrated in FIG. 1 is rotatable.

Hereinafter, exemplary embodiments of an X-type guide bar structure for preventing opposite sliding doors from swaying will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

According to an exemplary embodiment of the present invention, in a vehicle there are a center rail 20 (a rail disposed at a middle portion of the vehicle) and a lower rail 10 (a rail disposed at a lower side of the vehicle), but there is no upper rail 30 (a rail disposed at an upper side of the vehicle). Here, the center rail 20 is mounted on a sliding door 1 (hereinafter, referred to as a 'door'), and the lower rail 10 is provided on a vehicle body 2. A center slider 22 is rollably connected to the center rail 20, and the center slider 22 is rotatably connected to the vehicle body 2 by means of a second mounting bracket 26.

The doors 1 include a front door and a rear door. The X-type guide bar structure for preventing opposite sliding doors from swaying according to an exemplary embodiment of the present invention is applied to the front door or the rear door. Therefore, the X-type guide bar structures for preventing opposite sliding doors from swaying, which are applied to the front door and the rear door, respectively, are identical in configuration and operational principle. However, in the present specification, for convenience of description, an example in which the X-type guide bar structure for preventing opposite sliding doors from swaying is applied to any one of the doors 1 will be described.

Figure 3:
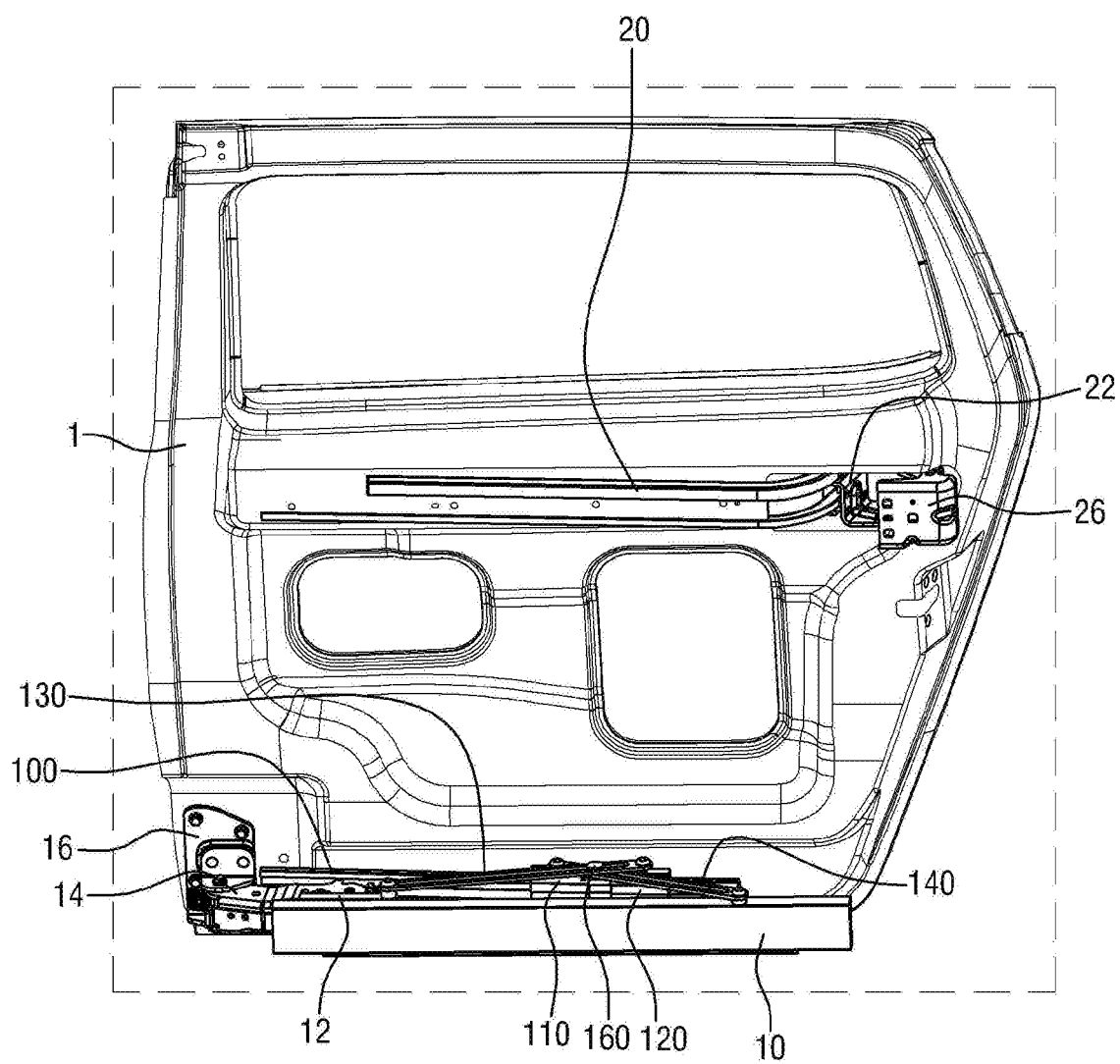
FIG. 3 is a view illustrating a state in which an X-type guide bar structure according to an exemplary embodiment of the present invention is applied to a vehicle.
Figure 4:
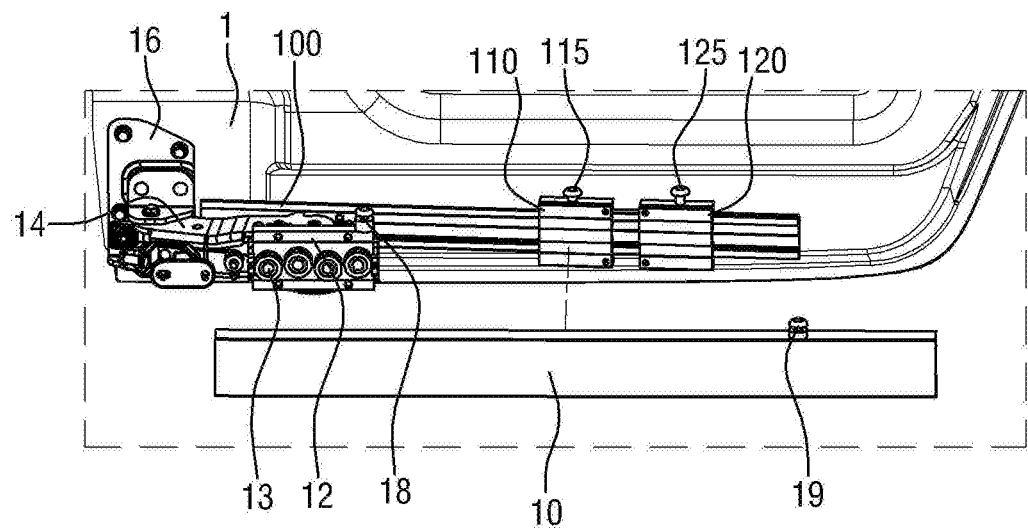
FIG. 4 is a view illustrating a state in which first and second guide bars are removed from the X-type guide bar structure according to an exemplary embodiment of the present invention.
Figure 5:
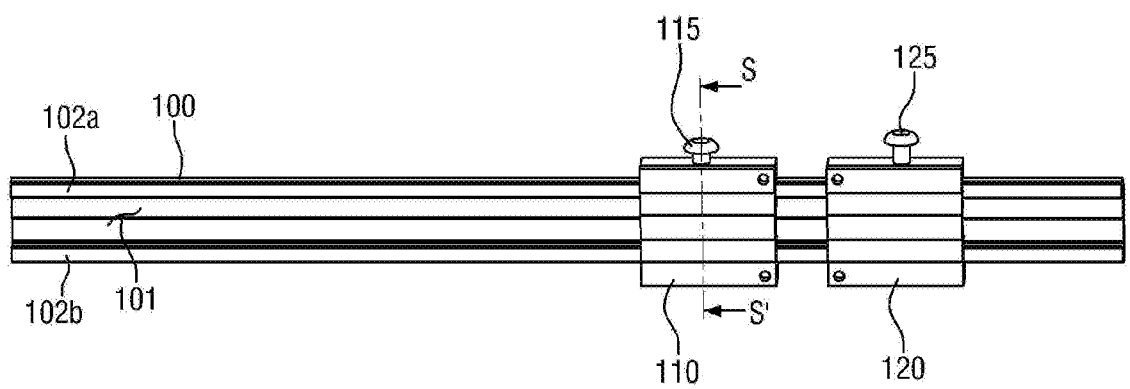
FIG. 5 is a view illustrating a state in which first and second guide sliders are connected to a guide rail according to an exemplary embodiment of the present invention.
Figure 6:
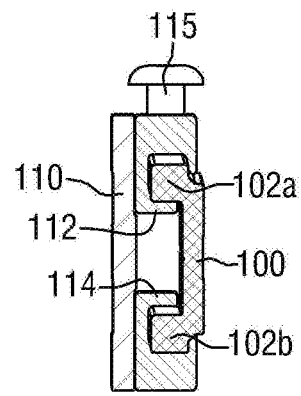
FIG. 6 is a view illustrating a cross section taken along line S-S' in FIG. 5.

FIG. 3 is a view illustrating a state in which an X-type guide bar structure according to an exemplary embodiment of the present invention is applied to a vehicle, FIG. 4 is a view illustrating a state in which first and second guide bars are removed from the X-type guide bar structure according to an exemplary embodiment of the present invention, FIG. 5 is a view illustrating a state in which first and second guide sliders are connected to a guide rail according to an exemplary embodiment of the present invention, and FIG. 6 is a view illustrating a cross section taken along line S-S' in FIG. 5. Meanwhile, in the drawings related to the embodiments of the present invention, the configuration of the vehicle body 2 is omitted in order to clearly show the X-type guide bar structure.

Referring to FIG. 3, the X-type guide bar structure for preventing opposite sliding doors from swaying according to an exemplary embodiment of the present invention is provided at lower sides of the vehicle body 2 and the door 1 and includes the lower rail 10, a guide rail 100, a first guide slider no, a second guide slider 120, a first guide bar 130, and a second guide bar 140.

Referring to FIG. 4, the lower rail 10 is elongated in a longitudinal direction of the vehicle body 2 and mounted on the vehicle body 2. The lower rail 100 has an approximately rectilinear shape. The lower rail 100 has a lower roller insertion portion (not illustrated).

Lower rollers 13 provided on a lower slider 12 are inserted into the lower roller insertion portion (not illustrated). The lower slider 12 is rollably connected to the lower rail 10. The lower slider 12 is rotatably connected to a lower swing arm 14. The lower swing arm 14 is rotatably connected to a first mounting bracket 16 mounted on the vehicle body 2. A first-first connecting portion 18 is formed at one side of the lower slider 12. A function of the first-first connecting portion 18 will be described below.

A second-first connecting portion 19 is formed at one side of the lower rail 10. In the exemplary embodiment of the present invention, the second-first connecting portion 19 is formed adjacent to a side based on a direction in which the door 1 is opened. Therefore, in the case of the rear door, the second-first connecting portion 19 is formed adjacent to the rear side (the right side in FIG. 4). In the case of the front door, the second-first connecting portion 19 is formed adjacent to the front side (the left side in FIG. 4). A function of the second-first connecting portion 19 will be described below.

Referring to FIG. 5, the guide rail 100 is elongated in the longitudinal direction of the vehicle body and mounted on the door 1. The guide rail 100 has an approximately rectilinear shape. The guide rail 100 has a guide rail groove 101. Protruding portions 102a and 102b are formed at both sides of the guide rail groove 101.

Referring to FIG. 6, the first guide slider no and the second guide slider 120 are movably connected to the guide rail 100. The first guide slider no and the second guide slider 120 have accommodating portions, respectively, and the accommodating portions have approximately the same shapes as the protruding portions 102a and 102b so that the protruding portions 102a and 102b may be inserted into the accommodating portions. In an exemplary embodiment of the present invention, the two accommodating portions are provided in a vertical direction, and a lower wall 112 formed on the upper accommodating portion and an upper wall 114 formed on the lower accommodating portion are inserted into the guide rail groove 101. While FIG. 6 illustrates only a connection relationship between the first guide slider no and the guide rail 100, the same applies to a connection relationship between the second guide slider 120 and the guide rail 100. As the protruding portions 102a and 102b are inserted into the accommodating portions, the first guide slider no and the second guide slider 120 are connected to the guide rail 100.

Based on the direction in which the door 1 is closed according to an exemplary embodiment of the present invention, the first guide slider no is closer to the front side (the left side in FIG. 4) than the second guide slider 120 is to the front side.

A first-second connecting portion 115 is formed at one side of the first guide slider no, and a second-second connecting portion 125 is formed at one side of the second guide slider 120. A function of the first-second connecting portion 115 and a function of the second-second connecting portion 125 will be described below.

Figure 7:
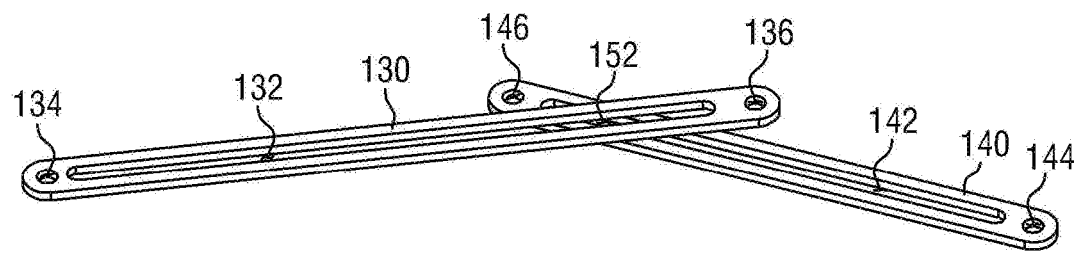
FIG. 7 is a view illustrating the first and second guide bars according to an exemplary embodiment of the present invention.
Figure 8:
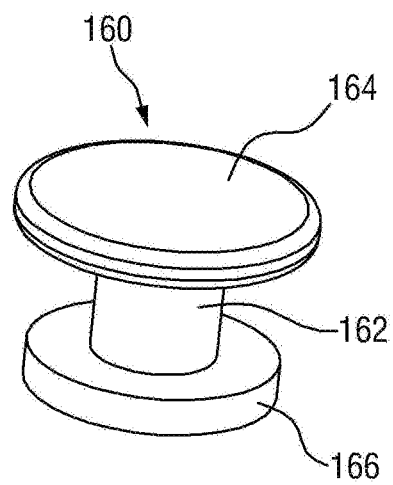
FIG. 8 is a view illustrating a guide pin according to an exemplary embodiment of the present invention.

FIG. 7 is a view illustrating the first and second guide bars according to an exemplary embodiment of the present invention, and FIG. 8 is a view illustrating a guide pin according to an exemplary embodiment of the present invention.

Referring to FIG. 7, the first guide bar 130 and the second guide bar 140 according to an exemplary embodiment of the present invention have a first guide hole 132 and a second guide hole 142, respectively. The first guide hole 132 and the second guide hole 142 each have a long hole shape and are elongated in the longitudinal direction approximately at centers of the first guide bar 130 and the second guide bar 140, respectively. Here, the first guide hole 132 and the second guide hole 142 provide guide paths for a guide pin 160 to be described below.

However, in another exemplary embodiment of the present invention, the guide paths formed by the first guide bar 130 and the second guide bar 140 each may have a long groove shape instead of the long hole shape.

When the first guide bar 130 and the second guide bar 140 overlap each other in an X shape, a central portion 152 is defined. The central portion 152 is a portion where the first guide hole 132 and the second guide hole 142 overlap each other to face each other, and a position of the central portion 152 is changed in accordance with a position at which the first guide hole 132 and the second guide hole 142 overlap each other.

A first-first insertion hole 134 is formed at one end of the first guide bar 130, and a second-second insertion hole 136 is formed at the other end of the first guide bar 130. The first-second connecting portion 115 is rotatably inserted into the first-first insertion hole 134, and the second-second connecting portion 125 is rotatably inserted into the second-second insertion hole 136, such that the lower slider 12 and the second guide slider 120 are connected to each other.

A second-first insertion hole 144 is formed at one end of the second guide bar 140, and a first-second insertion hole 146 is formed at the other end of the second guide bar 140. The second-first connecting portion 19 is rotatably inserted into the second-first insertion hole 144, and the first-second connecting portion 115 is inserted into the first-second insertion hole 146, such that the lower rail 10 and the first guide slider no are connected to each other.

The guide pin 160 is inserted into the central portion 152 in the state in which the first guide bar 130 and the second guide bar 140 overlap in the X shape.

Referring to FIG. 8, the guide pin 160 includes an insertion portion 162 inserted into the central portion 152 and first and second fixed ends 164 and 166 formed at both ends of the insertion portion 162 and configured to fix the insertion portion 162 to prevent the insertion portion 162 from being withdrawn from the central portion 152.

Meanwhile, in another exemplary embodiment of the present invention, the first fixed end 164 or the second fixed end 166 may be coupled to the insertion portion 162 by a threaded engagement. Then, the length of the insertion portion 162 may be adjusted by moving the first fixed end 164 or the second fixed end 166 in a threaded manner. In another exemplary embodiment of the present invention, the first fixed end 164 or the second fixed end 166 may be connected to the insertion portion 162 in other manners instead of the threaded engagement so that the length of the insertion portion 162 may be adjusted.

When the guide pin 160 is inserted into the central portion 152 in the state in which the first guide bar 130 and the second guide bar 140 overlap in the X shape, the guide pin 160 may move along the central portion 152. In this case, the X shape of the first guide bar 130 and the second guide bar 140 is maintained even though the guide pin 160 moves.

As the length of the insertion portion 162 is adjusted, the guide pin 160 may adjust a frictional force applied between the first guide bar 130 and the second guide bar 140. For example, when the length of the insertion portion 162 inserted into the central portion 152 is decreased, the frictional force applied between the first guide bar 130 and the second guide bar 140 is increased. In this case, the guide pin 160 may move only when a predetermined or higher force, which overcomes the frictional force, is applied.

Figure 9:
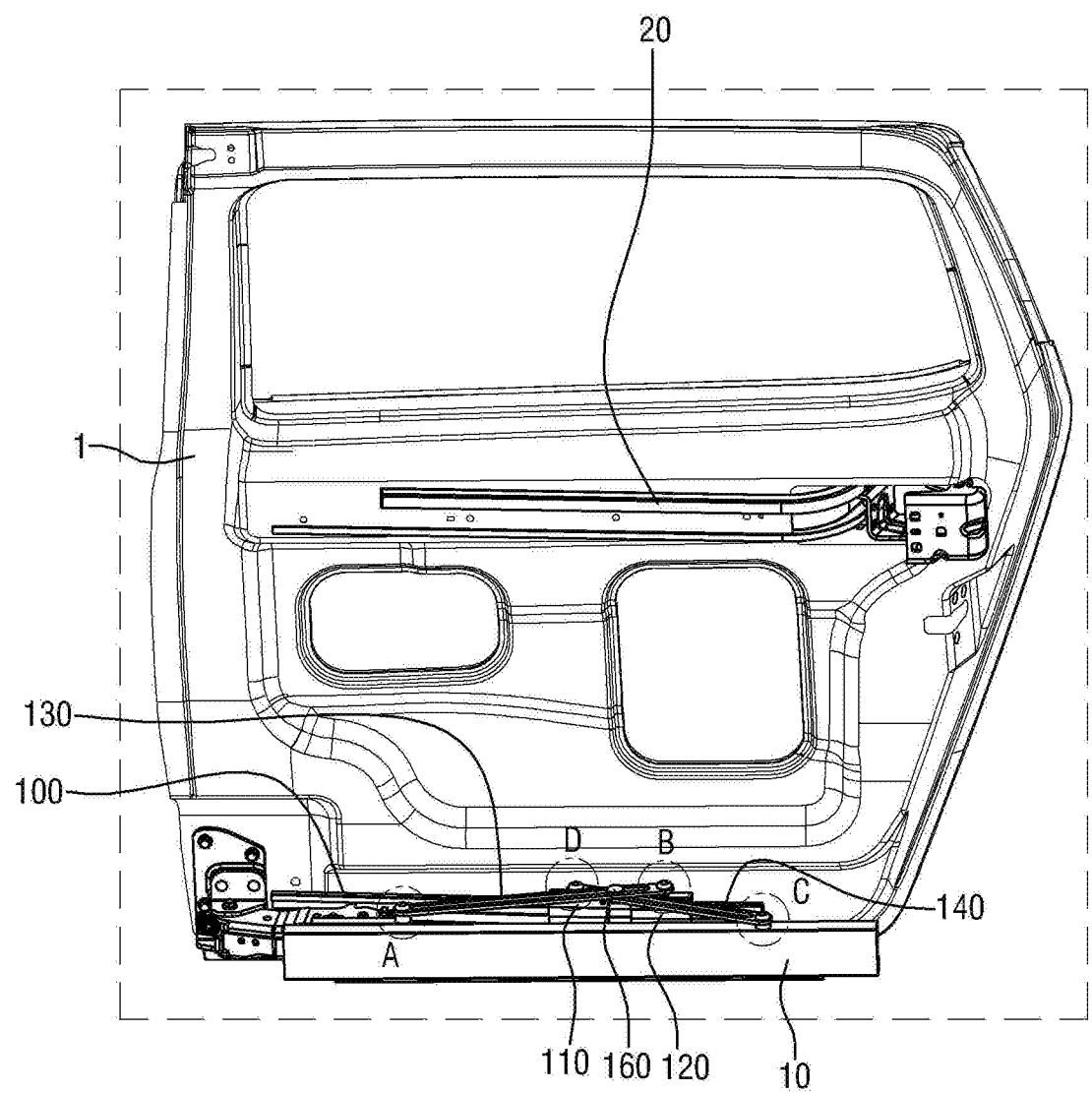
FIG. 9 is a view illustrating the X-type guide bar structure in a state in which a sliding door is closed.
Figure 10:
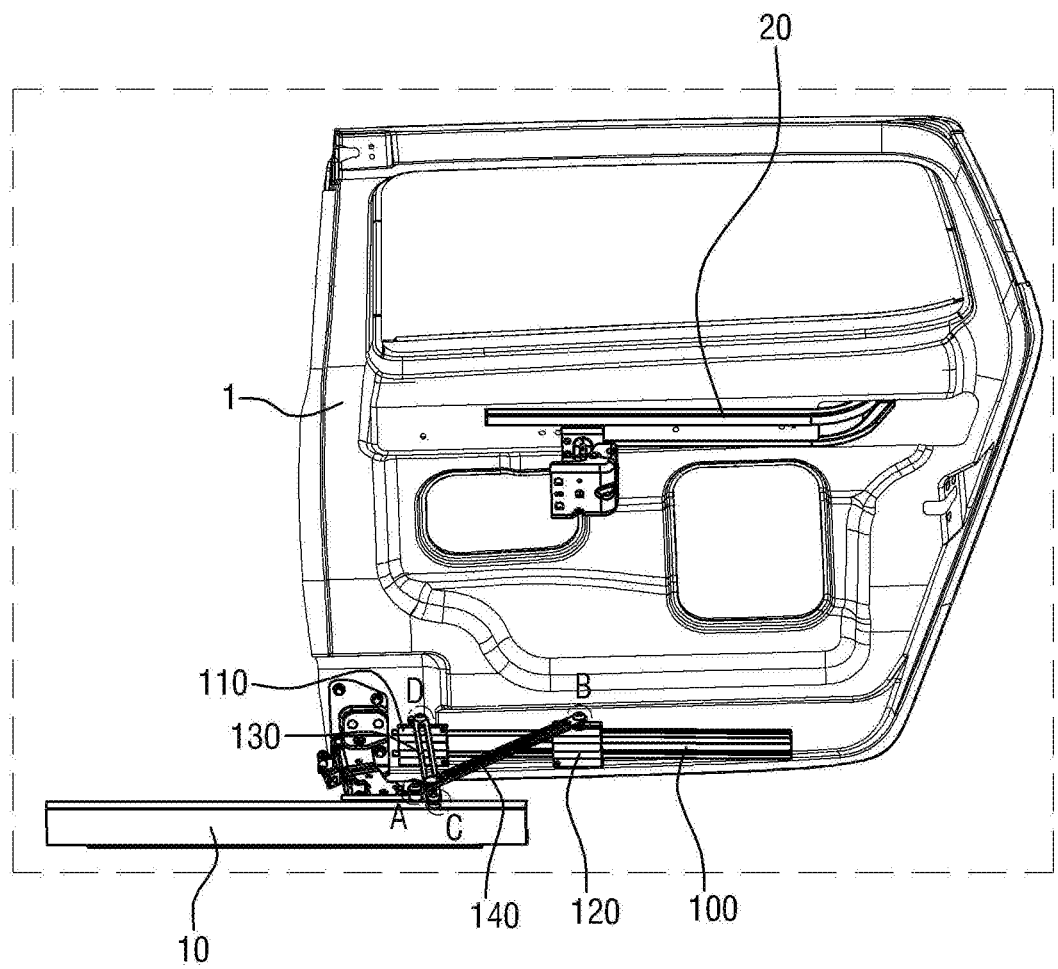
FIG. 10 is a view illustrating the X-type guide bar structure in a state in which the sliding door is opened.

FIG. 9 is a view illustrating the X-type guide bar structure in a state in which the sliding door is closed, and FIG. 10 is a view illustrating the X-type guide bar structure in a state in which the sliding door is opened.

Hereinafter, operating states of the X-type guide bar structure according to the exemplary embodiment of the present invention will be described with reference to FIGS. 9 and 10.

Referring to FIG. 9, in the state in which the door 1 is closed, the lower slider 12 is positioned at one side of the lower rail 10 based on the direction in which the door 1 is closed (in the left direction in FIG. 9). In this case, the first-first connecting portion 18 inserted into the first-first insertion hole 134 and the second-first connecting portion 19 inserted into the second-first insertion hole 144 are positioned farthest from each other, and the first-second connecting portion 115 inserted into the first-second insertion hole 146 and the second-second connecting portion 125 inserted into the second-second insertion hole 136 are positioned closest to each other. Both lower ends of the X shape formed by the first guide bar 130 and the second guide bar 140 are spread, and both upper ends of the X shape are retracted. In this case, the first guide slider no and the second guide slider 120 remain close to each other.

In the state in which the door 1 is closed, the door 1 is supported at four support points by the X-type guide bar structure according to an exemplary embodiment of the present invention, and the four support points include a connection point A between the first guide bar 130 and the lower slider 12, a connection point B between the first guide bar 130 and the second guide slider 120, a connection point C between the second guide bar 140 and the lower rail 10, and a connection point D between the second guide bar 140 and the first guide slider no.

Meanwhile, the X shape according to an exemplary embodiment of the present invention is formed in parallel with the vehicle body 2. Therefore, the door 1 is prevented from swaying in a width direction (H direction) of the vehicle body 2.

When the door 1 in the closed state begins to be opened, the lower swing arm 14 is rotated, and the lower slider 12 is moved in the direction in which the door 1 is opened (the right direction in FIG. 9). Therefore, the first-first connecting portion 18 moves together with the lower slider 12. Since the second-first connecting portion 19 is fixed to the lower rail 10, the first-first connecting portion 18 and the second-first connecting portion 19 become close to each other. Further, the guide pin 160 is moved in one direction along the central portion 152 (the downward direction in FIG. 9), both upper ends of the X shape formed by the first guide bar 130 and the second guide bar 140 are spread, and both lower ends of the X shape are retracted. In this case, the first guide slider no and the second guide slider 120 gradually move away from each other.

The four support points at which the door 1 is supported by the X-type guide bar structure according to an exemplary embodiment of the present invention are maintained even while the door 1 is opened, such that the door 1 may be prevented from swaying and supported stably.

Referring to FIG. 10, in the state in which the door 1 is fully opened, the central portion 152 of the X shape formed by the first guide bar 130 and the second guide bar 140 may not be moved downward any further, and the lower slider 12 stops moving. In this case, the first-first connecting portion 18 and the second-first connecting portion 19 are positioned closest to each other, and the first-second connecting portion 115 and the second-second connecting portion 125 are positioned farthest from each other. Both upper ends of the X shape formed by the first guide bar 130 and the second guide bar 140 are spread, and both lower ends of the X shape are retracted. In this case, the first guide slider no and the second guide slider 120 remain distant from each other.

The four support points at which the door 1 is supported by the X-type guide bar structure according to an exemplary embodiment of the present invention are maintained even in the state in which the door 1 is fully opened, such that the door 1 may be prevented from swaying and supported stably.

Meanwhile, a process reverse to the above-mentioned operating process is performed when the door 1 moves in the direction from the opened state to the closed state.

Meanwhile, in addition to the X-type guide bar structure according to an exemplary embodiment of the present invention, the support points at which the door 1 is supported further include a contact point between the lower rail 100 and the lower slider 12 and a contact point between the center rail 20 and the center slider 22. Therefore, with these contact points, the door 1 may be more stably supported.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. An X-type guide bar structure for preventing opposite sliding doors from swaying, the X-type guide bar structure comprising:
    a lower rail mounted in a longitudinal direction at a lower side of a vehicle body;
    a lower slider rollably connected to the lower rail;
    a guide rail mounted on a door in the longitudinal direction of the vehicle body;
    first and second guide sliders movably connected to the guide rail; and
    first and second guide bars having guide paths in the longitudinal direction,
    wherein the first guide bar is rotatably connected to the lower slider and the second guide slider, the second guide bar is rotatably connected to the lower rail and the first guide slider, the first and second guide bars overlap in an X shape so that the guide paths face each other, and a guide pin is inserted into a central portion of the X shape.

2. The X-type guide bar structure of claim 1, wherein the guide paths each have a long hole shape elongated in the longitudinal direction.

3. The X-type guide bar structure of claim 1, wherein one end of the second guide bar is rotatably and fixedly coupled to one side of the lower rail.

4. The X-type guide bar structure of claim 1, wherein the guide pin is configured to move along the guide paths and the X shape of the first and second guide bars is maintained.

5. The X-type guide bar structure of claim 1, wherein the guide rail has a protruding portion, and the first and second guide sliders each have an accommodating portion configured to accommodate the protruding portion.

6. The X-type guide bar structure of claim 1, wherein the X shape is formed parallel with the longitudinal direction of the vehicle body.

7. The X-type guide bar structure of claim 1, wherein a length of the guide pin is changed to adjust a frictional force applied between the first and second guide bars.

8. The X-type guide bar structure of claim 1, wherein support points at which the door is supported comprise a connection point between the first guide bar and the lower slider, a connection point between the first guide bar and the second guide slider, a connection point between the second guide bar and the lower rail, and a connection point between the second guide bar and the first guide slider.

9. A vehicle comprising:
    a vehicle body;
    a door attached to the vehicle body;
    a guide bar structure comprising:
        a lower rail mounted in a longitudinal direction at a lower side of the vehicle body;
        a lower slider rollably connected to the lower rail;
        a guide rail mounted on the door in the longitudinal direction of the vehicle body;
        a first guide slider movably connected to the guide rail;
        a second guide slider movably connected to the guide rail;
        a first guide bar rotatably connected to the lower slider and the second guide slider and having a first guide path in the longitudinal direction of the vehicle body;
        a second guide bar rotatably connected to the lower rail and the first guide slider and having a second guide path in the longitudinal direction of the vehicle body, wherein the first guide bar and the second guide bars overlap in an X shape so that the first guide path and the second guide path face each other; and
        a guide pin inserted into a central portion of the X shape.

10. The vehicle of claim 9, wherein each of the first guide path and the second guide path has a long hole shape elongated in the longitudinal direction.

11. The vehicle of claim 9, wherein one end of the second guide bar is rotatably and fixedly coupled to one side of the lower rail.

12. The vehicle of claim 9, wherein the guide pin is configured to move along the first guide path and the second guide path, and the X shape of the first and second guide bars is maintained.

13. The vehicle of claim 9, wherein the guide rail has a protruding portion, and the first and second guide sliders each have an accommodating portion configured to accommodate the protruding portion.

14. The vehicle of claim 9, wherein the X shape is formed parallel with the longitudinal direction of the vehicle body.

15. The vehicle of claim 9, wherein a length of the guide pin is changed to adjust a frictional force applied between the first and second guide bars.

16. The vehicle of claim 9, wherein support points at which the door is supported comprise a connection point between the first guide bar and the lower slider, a connection point between the first guide bar and the second guide slider, a connection point between the second guide bar and the lower rail, and a connection point between the second guide bar and the first guide slider.

17. The vehicle of claim 9, further comprising:
    a center rail mounted on the door; and
    a center slider rollably connected to the center rail and rotatably connected to the vehicle body.

18. A vehicle comprising:
    a vehicle body;
    a door attached to the vehicle body;
    a lower rail mounted in a longitudinal direction at a lower side of the vehicle body;
    a lower slider rollably connected to the lower rail;

a guide rail mounted on the door in the longitudinal direction of the vehicle body;
a first guide slider movably connected to the guide rail
a second guide slider movably connected to the guide rail;
a first guide bar rotatably connected to the lower slider and the second guide slider and having a first guide path in the longitudinal direction of the vehicle body;
a second guide bar rotatably connected to the lower rail and the first guide slider and having a second guide path in the longitudinal direction of the vehicle body, wherein the first guide bar and the second guide bars overlap in an X shape so that the first guide path and the second guide path face each other;
a center rail connected to the door; and
a center slider connected to the center rail and connected to the vehicle body.

19. The vehicle of claim 18, further comprising a guide pin inserted into a central portion of the X shape, the guide pin being configured to move along the first guide path and the second guide path.

20. The vehicle of claim 18, further comprising:
a first door support point between the first guide bar and the lower slider;
a second door support point between the first guide bar and the second guide slider;
a third door support point between the second guide bar and the lower rail; and
a fourth door support point between the second guide bar and the first guide slider.

\* \* \* \* \*